United States Patent [19]
Sordello et al.

[11] Patent Number: 4,612,586
[45] Date of Patent: Sep. 16, 1986

[54] METHOD FOR MEASURING TIMING ASYMMETRY IN A MAGNETIC STORAGE SYSTEM

[75] Inventors: Frank J. Sordello, Los Gatos; Andrew M. Rose, Mt. View, both of Calif.

[73] Assignee: Memorex Corporation, Santa Clara, Calif.

[21] Appl. No.: 617,431

[22] Filed: Jun. 5, 1984

[51] Int. Cl.$^4$ .................... G11B 27/36; G11B 15/02; G11B 5/09

[52] U.S. Cl. ..................................... 360/31; 360/25; 360/45

[58] Field of Search ................... 360/31, 45, 25, 53, 360/51

[56] References Cited

U.S. PATENT DOCUMENTS 3,947,875 3/1976 Bull et al. ............................. 360/31
4,009,490 2/1977 Fassbender ........................... 360/45
4,333,177 6/1982 Sutterlin ............................... 360/31

Primary Examiner—Vincent P. Canney
Attorney, Agent, or Firm—Nathan Cass; David W. Heid; Kevin R. Peterson

[57] ABSTRACT

A method for measuring bit shift, timing asymmetry and other characteristics indicative of the performance of a magnetic storage system, particularly for a system employing a thin-film magnetic head. In a preferred embodiment, complementary patterns are written many times around a circular track of a magnetic disk, each pattern including relatively closely spaced magnetic transitions as well as relatively widely spaced magnetic transitions. The relatively widely spaced transitions are chosen so as to be substantially unaffected by any other transitions. Measurements are made with reference to these widely spaced transitions and averaged for the many patterns recorded in the track so as to rapidly provide highly reliable measurements indicative of system performance.

8 Claims, 8 Drawing Figures 4,612,586

METHOD FOR MEASURING TIMING ASYMMETRY IN A MAGNETIC STORAGE SYSTEM

REFERENCE TO RELATED PATENT APPLICATION

Our concurrently filed patent application Ser. No. 617,437 for Method for Testing Components of a Magnetic Storage System contains related subject matter.

BACKGROUND OF THE INVENTION

The present invention relates to an improved method for testing components in a magnetic disk storage system, and more particularly relates to testing components in a system employing a thin film magnetic head.

As is well known, disk drives are an important part of most modern day computer systems. A disk drive typically employs one or more read/write magnetic heads whose performance is critical to the obtaining of satisfactory performance of the overall disk drive. It is thus of considerable importance, particularly for high volume head manufacturing, to provide for the rapid, accurate and reliable testing of the performance of a magnetic head. The provision of such testing is especially important in connection with the manufacture of new types of magnetic heads, such as thin film heads, which have different characteristics than conventional ferrite heads, and for which there is very little field experience.

An important characteristic indicative of the performance of a magnetic head is conventionally known as "bit shift" (also called peak shift) which is usually a result of the density of recording, the nature of the pattern being recorded, and also the presence of noise. As is well known, bit shift causes a bit to be detected at a time shifted by a certain amount from the expected time of detection, which if sufficiently large compared to the bit-cell time can cause data errors in a magnetic recording and reproducing system.

Another important characteristic indicative of the performance of a magnetic head is head timing asymmetry. The presence of head timing asymmetry is indicated, for example, when unwanted readback signal timing differences are produced dependent on the direction of change of the recorded magnetic transitions. Such head timing asymmetry can also be a source of unwanted bit shift.

Known approaches for measuring bit shift and head timing asymmetry have typically employed indirect techniques, such as by using reproduction frequency response measurements to determine "resolution", or by the use of isolated pulse superposition techniques. These known approaches have various disadvantages, such as being unduly time consuming, expensive and/or complex. In addition, the resolution approach can give quite inaccurate results when used for measuring the characteristics of thin film heads.

BRIEF SUMMARY OF THE PRESENT INVENTION

It is accordingly a primary object of the present invention to provide an improved method for testing magnetic recording and reproducing components which is rapid, accurate and reliable.

Another object of the invention in accordance with the foregoing object is to provide a method which can be used for testing most types of magnetic heads (including thin film heads) as well as the magnetic medium, the reproduction system and various combinations thereof.

A further object of the invention is to provide an improved method for measuring the head timing asymmetry of a magnetic head.

An additional object of the invention is to provide the methods of the foregoing objects in a relatively simple and non-complex manner.

In a particular preferred embodiment of the invention, the above objects are achieved by employing an approach in which a predetermined testing pattern is written many times around a circular track of a rotating magnetic disk. The predetermined testing pattern which is written includes both relatively widely spaced transitions as well as closely spaced magnetic transitions. It has been found that timing asymmetry as well as bit shift can accurately be determined by comparing particular measured time interval differences obtained between written and detected readback transition locations for the many patterns written around the track.

The specific nature of the invention as well as other features, objects, advantages and uses thereof will become apparent from the following description of a particular preferred embodiment of the invention in conjunction with the accompanying drawings.

DESCRIPTION OF A PREFERRED EMBODIMENT

Figure 1:
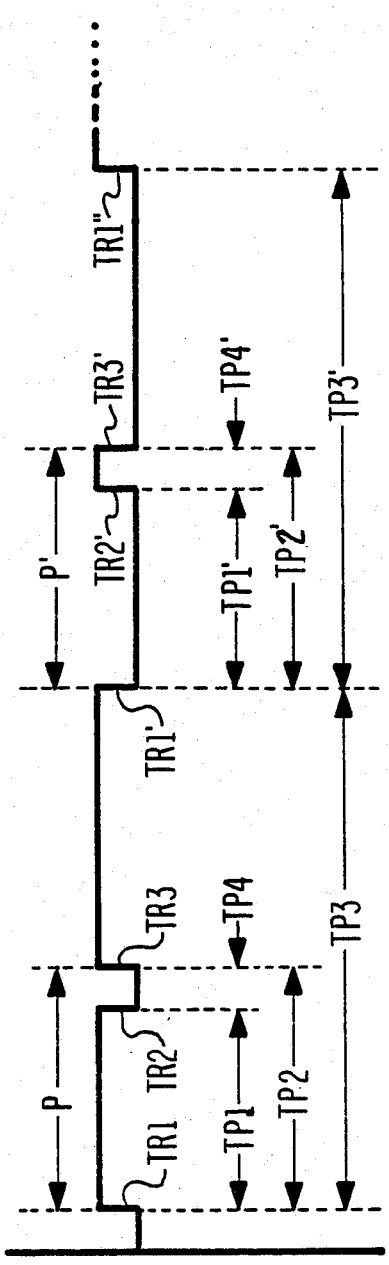
FIG. 1 is a timing graph illustrating the recording patterns employed in a preferred embodiment of the invention.

Like characters and numerals refer to like elements throughout the figures of the drawings.

As is well known, a magnetic head writes data on a rotating magnetic disk by magnetizing small regions of a magnetic film as the disk rotates. The areas where the direction of magnetism changes are called magnetic transitions or flux reversals. Conventional non-"thin-film" read-write magnetic heads may have ferrite or mu-metal read-write elements and are mounted on a slider made of ceramic or bulk ferrite. The aerodynamic portion slider is typically shaped by grinding and lapping. Glass bonding is conventionally used to form the elements of the magnetic poles as well as the read-write gap. The read write coil is wirewound. On the other hand, a thin film read-write magnetic head is typically made by depositing the magnetic elements of the head by sputtering, evaporation or plating on a substrate that typically is later machined into the aerodynamic portions of the air-bearing slider.

Besides signal amplitude, other important characteristics of the read-write process performed by a magnetic head in conjunction with the other parts of the system are the signal-to-noise ratio and the timing of the signal. In order to read a magnetic transition in its correct time position, it must be detected within an interval known as the bit-cell time. If a timing error exceeds a certain portion of this bit-cell time, a data error may occur.

Several factors contribute to timing errors, the most significant being commonly referred to as bit-shift or peak-shift. Simply stated, bit-shift is the difference between the time that a previously written magnetic transition is detected upon readback and the time at which the magnetic transition should have been detected. Bit-shift is typically of two major types: (1) pattern induced bit shift and (2) noise induced bit shift.

Pattern induced bit-shift is produced when adjacently recorded transitions along the recorded track are sufficiently close to cause shifts in the locations of the peaks of the readback signal. Bit shift as caused by the head is due to the fact that the head senses any and all magnetic fields that induce flux through the magnetic path of the head. When bits are recorded at high densities, the head tends to pick up not only the field from the immediate recorded bit, but also the fields from the adjacent bits along the recorded track. The head output is, therefore, representative of the combined fields, which induces bit shift in the apparent location of the immediate bit. Pattern induced bit shift may also be produced as a result of head timing asymmetry, since bit shifts may occur as a result of readback signal timing differences caused by the head responding differently to different directions of change of the magnetic transitions.

Generally, as bit density increases, so does the bit-shift. Eventually, as bit density is increased, the bit-shift gets so large as to prevent reliable reading of the written data. Noise induced bit-shift also affects the locations of the peaks in the readback signal, but usually in a random manner.

It will thus be appreciated that the bit-shift performance in a magnetic recording and reproducing system is a very important characteristic to be tested in order to determine whether the system is satisfactory. In accordance with the present invention, a rapid, reliable, accurate and relatively simple method and apparatus are provided for measuring bit-shift and timing asymmetry as well as other important system characteristics.

Figure 2:
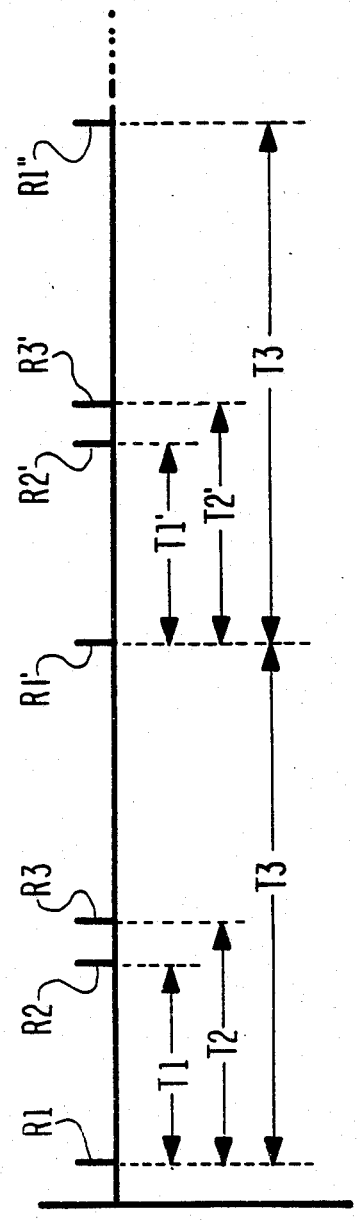
FIG. 2 is a timing graph illustrating the detected readback pulses produced by an exemplary system in response to the recorded pattern of FIG. 1.

Initially, a preferred example of the basic improved testing method of the invention will be considered with reference to FIGS. 1 and 2.

FIG. 1 is a graph illustrating predetermined complementary patterns P and P' which are written many times around a track of a disk. It will be noted that the complementary patterns P and P' differ in that corresponding transitions of P and P' are in opposite directions in FIG. 1. As shown, each pattern (P or P') comprises a first transition (TR1 or TR1') followed by a relatively widely spaced second transition (TR2 or TR2') which in turn is followed by a relatively closely spaced transition (TR3 or TR3'). In a preferred embodiment, relatively closely spaced transitions TR2, TR3 and TR2', TR3' in patterns P and P' are chosen to have respective spacings TP4 and TP4' corresponding to the closest transition spacing to be detected by the head being tested, while the relatively widely spaced transitions TR1, TR2 and TR1', TR2' in patterns P and P' are chosen to have respective spacings TP1 and TP1' such that the detected location obtained for transitions TR1 and TR1' on readback will not be affected by adjacent transitions. The respective spacings TP3 and TP3' between patterns P and P' are likewise chosen so that the transitions in adjacent patterns P and P' do not affect the detected locations of transitions TR1 and TR1'.

FIG. 2 illustrates typical detected pulses R1, R2, R3 and R1', R2', R3' derived from readback of the respective corresponding transitions TR1, TR2, TR3 and TR1', TR2', TR3' in the patterns P and P' in FIG. 1. In the preferred embodiment in accordance with the invention, the most significant time interval measurements are the time intervals T1, T2 and T3 for pattern P and the time intervals T1', T2' and T3' for pattern P', which correspond to transition spacings TP1, TP2, TP3, TP1', TP2' and TP3', respectively, In FIG. 1. As shown in FIG. 2 for the pattern P, T1 is the time interval between the detection of pulses R2 and R1, T2 is the time interval between the detection of pulses R3 and R1', T3 is the time interval between the detection of pulses R1' and R1. Similarly, for pattern P' T1' is the time interval between the detection of pulses R2' and R1', T2' is the time interval between the detection of pulses R3' and R1' and T3' is the time interval between the detection of pulses R1 and R1'. It has been found that by analyzing the differences between these time intervals T1, T2, T3 and T1', T2', T3' derived from playback and those that would ideally be obtained for the corresponding transition spacings TP1, TP2, TP3 and TP1', TP2', TP3' in FIG. 2 for the many patterns P and P' written around a disk track, it is possible to rapidly and accurately determine a surprising number of highly significant magnetic characteristics indicative of system performance.

Figure 3:
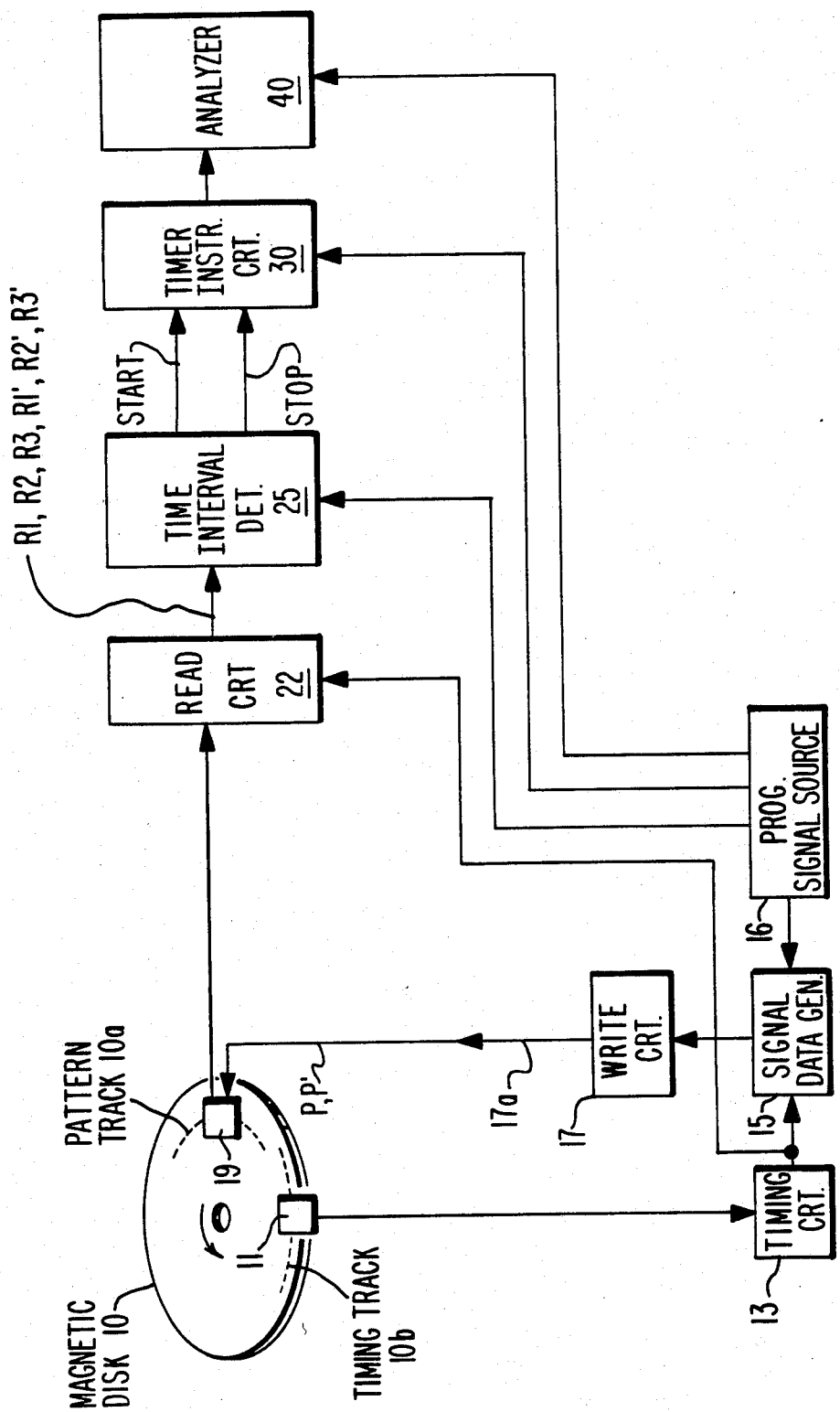
FIG. 3 is a block and schematic diagram illustrating a preferred embodiment used for testing the performance of magnetic heads in accordance with the invention.

Reference is now directed to FIG. 3 which illustrates a particular example of preferred apparatus in accordance with the invention.

As shown in FIG. 3, a rotatable magnetic disk 10 is provided of the type which is to be used with the magnetic heads to be tested. The disk 10 can be prewritten with the patterns P and P' (FIG. 1) in pattern track 10a, or else, these patterns could be written in pattern track 10a by the head 12 under test in order to test the head's write performance. Writing of the patterns P and P' in track 10a, for example, is accomplished using a timing track 10b which is read by a magnetic head 11 (or some other suitable transducer) to provide disk timing signals to timing circuitry 13 for providing appropriate timing signals (synchronized with disk rotation) to a conventional form of signal data generator 15. The signal data generator 15 operates in response to input control signals from a conventional programmable signal source 16 for applying predetermined pattern signals (corresponding to P and P' in FIG. 1) to conventional write circuitry 17 which, in response to timing signals from timing circuitry 13, provides appropriate write signals 17a to a magnetic head 19 for writing the patterns P and P' (FIG. 1) in the pattern track 10a.

Still with reference to FIG. 3, when read performance is to be tested, the head 19 is caused to read the patterns P and P' (FIG. 1) in the pattern track 10a and the resultant head output is applied to conventional read circuitry 22 which produces detected output pulses R1, R2, R3, R1', R2', R3', such as illustrated in FIG. 2. For this purpose, the read circuitry 22 may also receive disk timing signals from timing circuitry 13. The speed of rotation of the disk 10 should preferably be the same as that which will be used when the system is operated.

The detected pulses R1, R2, R3, R1', R2', R3' (FIG. 2) from the read circuitry 22 in FIG. 3 are applied to a conventional form of time interval detector 25 which serves as a pattern recognizer and is capable of distinguishing the applied pulses R1, R2, R3, R1', R2', R3'. Under the control of the signal source 16, time interval detector 25 produces start and stop output signals corresponding to the beginning and end, respectively, of particular selected timing intervals occurring between the applied pulses R1, R2, R3, R1', R2', R3'.

The start and stop output signals produced by the time interval selector 25 are in turn applied to timer instrumentation circuitry 30 which may also be of conventional form. The timer instrumentation circuitry 30 operates in a conventional manner to accurately measure the time between each corresponding pair of start and stop pulses received from the time interval detector 25 and to apply signals representative of the resulting time interval measurements to analyzing circuitry 40. The analyzing circuitry 40 also receives signals from source 16 related to the time intervals between particular ones of the transitions TR1, TR2, TR3, TR1', TR2', TR3' of the patterns P and P' shown in FIG. 1.

In accordance with the preferred embodiment of the present invention being considered herein, the important timing intervals to be analyzed are the recorded transition intervals TP1, TP2, TP3, TP1', TP2', TP3' of patterns P and P' (FIG. 1) and the corresponding playback time intervals T1, T2, T3, T1', T2', T3' derived from pulses R1, R2, R3, R1', R2', R3' (FIG. 2). By analyzing the differences between corresponding ones of these particular recording and playback timing intervals, accurate measurements can be derived indicative of pattern induced bit shift (both left and right), noise induced bit shift, and also bit shift caused by noise. Additionally, a measurement of timing asymmetry can also be derived. Accordingly, in order to provide for the analysis of these intervals by the analyzing circuitry 40 in FIG. 3, the time interval detector 25 is adapted to provide start and stop output signals to the timer instrumentation circuitry 30 corresponding to the playback timing intervals T1, T2, T3, T1', T2', T3' intervals in FIG. 2, and the signal source 16 is caused to provide signals to the analyzing circuitry 40 representative of the corresponding recorded transition intervals TP1, TP2, TP3, TP1', TP2', TP3'.

It is to be understood that the analyzer 40 may be implemented by hardware, by an appropriately programmed computer, or by a combination of both. For the purposes of this description, the various analyzer functions will be illustrated as being implemented by readily providable components, such as illustrated in FIGS. 4-7. From the description provided, one skilled in the art will readily be able to provide an appropriately programmed computer to perform all or any desired portion of these analyzer functions.

The manner in which pattern induced bit shift is determined in the preferred embodiment will first be considered. It will be understood with reference to FIGS. 1 and 2 that the difference between the timing intervals TP1 and T1 and between TP1' and T1' will be a measure of left bit shift, while the difference between the timing intervals TP2 and T2 and between TP2' and T2' will be a measure of right bit shift. The left and right bit shift measured for a single recorded pattern P or P' in FIG. 1 will, of course, include not only the pattern induced bit shift, but also any bit shift which may be caused by media irregularities local to the individual recorded transitions of the pattern, as well as any bit shift which may be caused by instantaneous noise occurring concurrently with the detection of the first and last pulses of the interval. In the preferred embodiment of the invention, the pattern induced left and right bit shifts are advantageously derived by averaging the differences measured between the respective intervals TP1 and T1 and TP1' and T1' (for left pattern induced bit shift) and between TP2 and T2 and TP2' and T2' (for right pattern induced bit shift) for the many patterns P and P' recorded around the pattern track 10a (FIG. 3), thereby substantially removing bit shift effects caused by media irregularities and noise.

Figure 4:
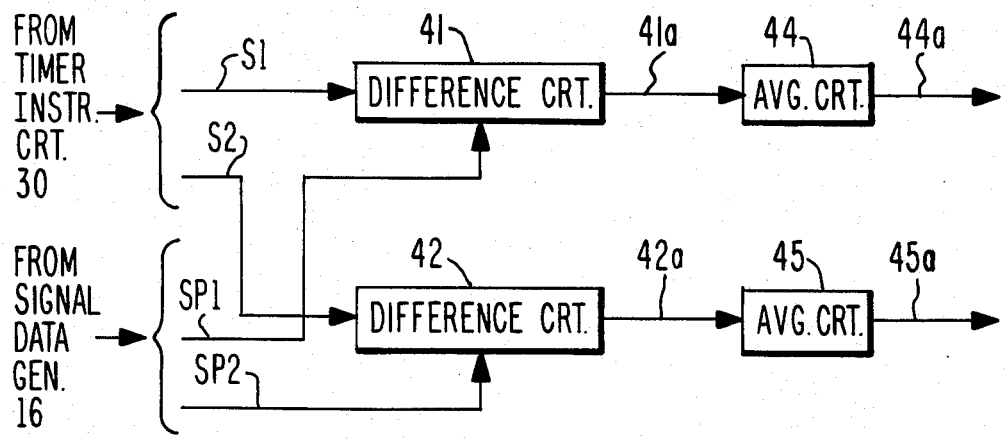
FIG. 4 illustrates exemplary apparatus which may be provided in the analyzer 40 of FIG. 3 for measuring pattern induced bit shift.

An exemplary implementation which may be provided in the analyzer 40 for obtaining pattern induced bit shift in accordance with the foregoing is illustrated in FIG. 4. It will be seen in FIG. 4 that for this purpose the analyzer 40 includes difference circuits 41 and 42 feeding averaging circuits 44 and 45, respectively. The difference circuit 41 receives signals S1 from the timer instrumentation circuitry 30 which are representative of the time intervals T1 and T1' and also receives signals SP1 from the signal source 16 which are representative of the time intervals TP1 and TP1'. The difference circuit 42 receives signals S2 which are representative of the time intervals T2 and T2' from the timer instrumentation circuitry 30 and also receives signals SP2 from the signal source 16 which are representative of the time intervals TP2 and TP2'. These difference circuits 41 and 42 operate to successively produce output signals 41a and 42a, respectively, which are representative of the measured differences obtained between corresponding ones of the applied time intervals as the disk 10 is rotated. These output signals 41a and 42a produced by the difference circuits 41 and 42, respectively, are applied to respective averaging circuits 44 and 45 to produce output signals 44a and 45a representative of the average of the measured differences applied thereto. From the previous discussion, it will be understood that the output signals 44a and 45a thus respectively represent the pattern induced left and right bit shifts.

Figure 5:
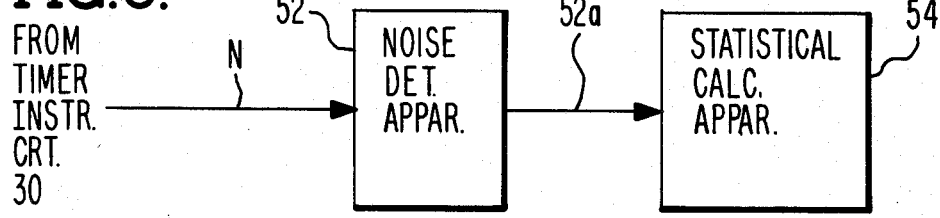
FIG. 5 illustrates exemplary apparatus which may be provided in the analyzer 40 of FIG. 3 for measuring noise induced bit shift.

Next to be considered with additional reference to FIG. 5 is an exemplary implementation which may be provided in the analyzer 40 in FIG. 3 for measuring noise induced bit shift. As is well known, by registering the statistical time distribution of a received pulse, the jitter of the pulse can be determined. Noise detection apparatus for obtaining jitter in this manner are well known in the art. In the preferred embodiment of the invention, the jitter on the readback pulses is advantageously employed as an indication of noise induced bit shift. Accordingly, while the disk is rotating, time instrumentation circuitry 30 in FIG. 3 provides signals N representative of at least one of the readback time intervals T1, T2, T3, T1', T2', T3' to conventional noise detection apparatus 52 for determining the jitter on the individual readback pulses as the disk is rotated. The jitter output signal 52a produced by the noise detection apparatus is applied to conventional statistical calculation apparatus 54 to obtain an indication of the standard deviation of the jitter. In the preferred embodiment of the invention being considered, this standard deviation is used as a measure of noise induced bit shift.

Figure 6:
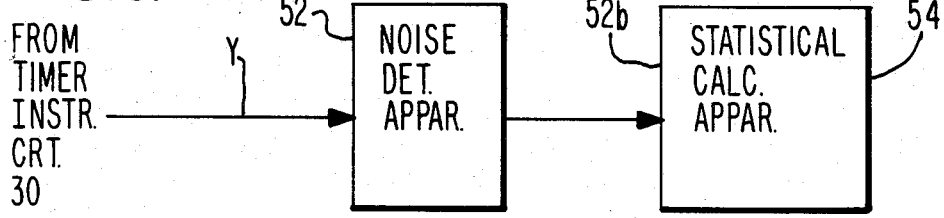
FIG. 6 illustrates exemplary apparatus which may be provided in the analyzer 40 of FIG. 3 for measuring timing asymmetry.

Reference is next directed to FIG. 6 illustrating an exemplary implementation which may be provided in the analyzer 40 in FIG. 3 for measuring timing asymmetry. It will be understood that timing asymmetry is present when the measured interval between the readback of a first occurring positive-going transition of a recorded pattern and the readback of a later occurring negative-going transition is different from the time interval between the readback of a first occurring negative-going transition and the readback of a later occurring positive-going transition.

It will be understood with reference to FIGS. 1 and 2 that each time interval T1 in FIG. 2 is an example of a readback time interval corresponding to a recorded time interval (TP1 in FIG. 1) which begins with a positive-going transition (TR1) and ends with a negative-going transition (TR2), while each time interval T1' in FIG. 2 is an example of a readback time interval corresponding to a recorded time interval (TP1') which begins with a negative-going transition (TR1') and ends with a positve going transition (TR2'). It will be noted that readback intervals T3 and T3' have the same relationship as intervals T1 and T1' in this regard. Thus, the jitter detected between T1 and T1' or between T3 and T3' will be dependent upon head timing asymmetry. However, this jitter will also be affected by noise. In order to remove the effect of noise, the jitter detected between T1 and T1' or between T3 and T3' is compared with the jitter detected for the time interval T2 or T2', which is essentially unaffected by timing asymmetry (since both T2 and T2' correspond to beginning and ending transitions which change in the same direction).

Accordingly, with reference to the exemplary implementation for measuring timing asymmetry shown in FIG. 6, it will be understood that, while the disk is rotating, the timing instrumentation circuitry 30 applies signals Y representative of at least one pair of the intervals T1 and T1' or T3 and T3' and at least one of the intervals T2 or T2' to noise detection apparatus 52 which may be the same as illustrated in FIG. 5. The noise detection apparatus 52 determines the comparative jitter between T2 or T2' and the applied pair T1 and T1' or T3 and T3' and applies a resultant jitter signal 52b corresponding thereto to statistical calculation apparatus 54 which may also be the same as illustrated in FIG. 5. The standard deviation of this jitter signal 52b is used as an indication of timing asymmetry.

Figure 7:
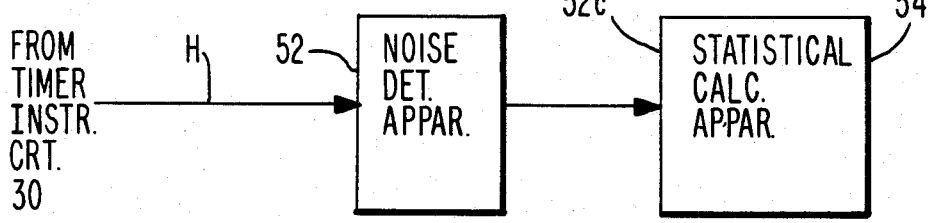
FIG. 7 illustrates exemplary apparatus which may be provided in the analyzer 40 of FIG. 3 for measuring bit shift caused by noise.

As pointed out in the previous paragraph, the time intervals T2 and T2' in FIG. 2 are essentially unaffected by any timing asymmetry. However, these intervals are affected by noise, thereby providing a convenient way of also determining noise. Thus, as illustrated in FIG. 7, the timer instrumentation circuitry 30 applies signals H representative of at least one of the intervals T2 or T2' to noise detection apparatus 52 which in turn provides a jitter signal 52c to statistical calculation apparatus 54. The standard deviation of this jitter signal is used as an indication of bit shift caused by noise. The noise cancellation apparatus 52 and the statistical calculation apparatus 54 may be the same as in FIGS. 5 and 6.

Figure 8:
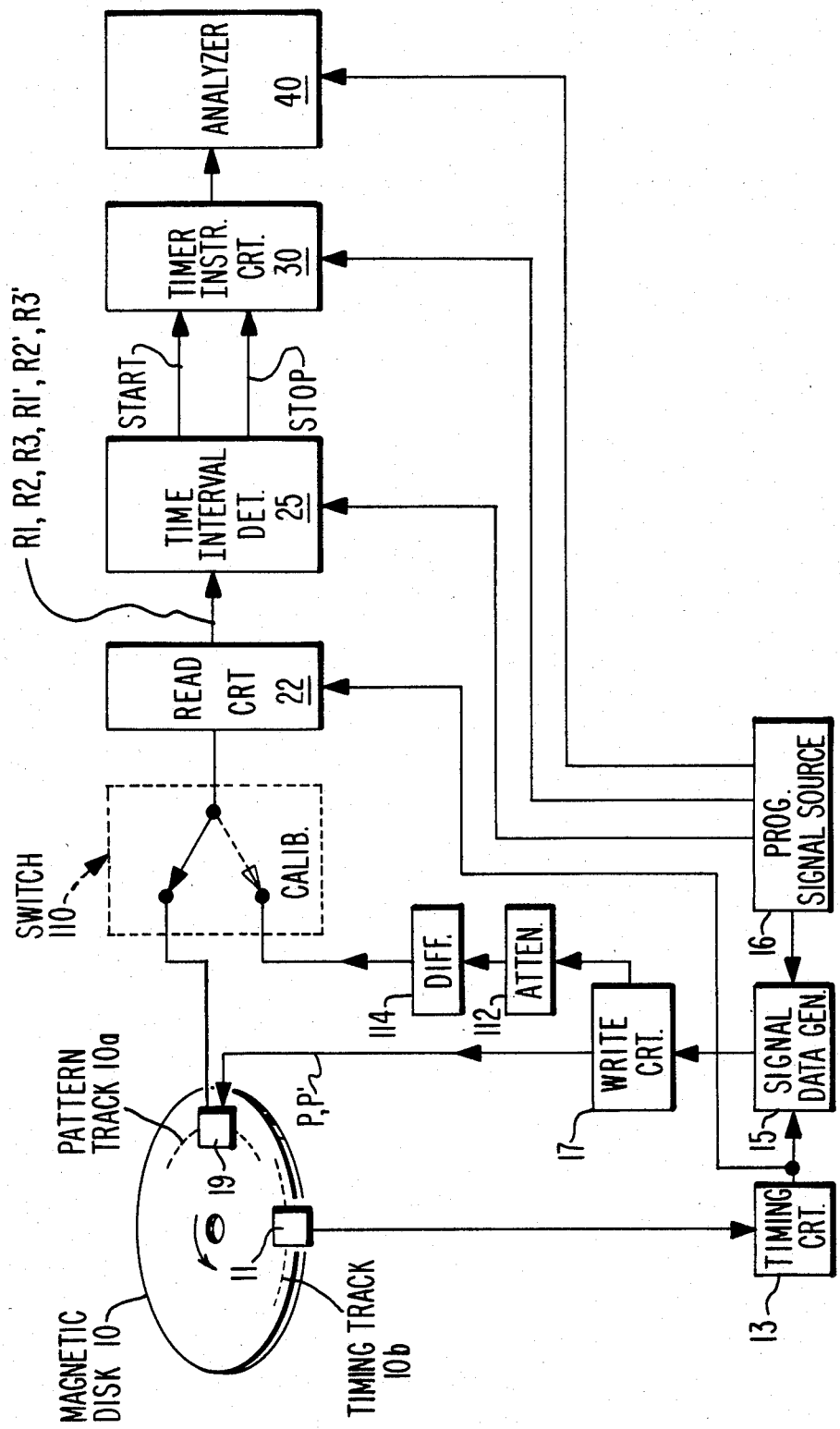
FIG. 8 illustrates a modification of the embodiment of FIG. 1 which additionally provides for calibrating the system.

Reference is next directed to FIG. 8 illustrating an improvement over the embodiment of FIG. 3 which provides for calibrating the system using the same write signals as used for writing the patterns P and P' in FIG. 1. As will be evident, the difference between the embodiments of FIGS. 3 and 8 resides in the provision of a switch 110 at the input to the read circuitry 22 which permits selecting either read signals from the head 19 or write signals from the write circuitry 17 applied via an attenuator 112 and a differentiator 114. The purpose of the attenuator 112 and differentiator 114 is to convert the write signals into "idealized" read signals for calibrating the system.

Thus, for calibrating purposes, the switch 110 is placed in its calibrate position to receive the "idealized" read signals provided at the output of the differentiator 114, and the various measurements previously described are then obtained. The differences between these measurements and those obtained for actual read signals will then provide more accurate resultant values.

It is to be understood that the present invention is not to be considered as limited to the particular embodiments disclosed herein, since many modifications and variations in construction, arrangement and use may be made without departing from the true spirit of the invention.

Accordingly, the present invention is to be considered as including all possible modifications and variations coming within the scope of the invention as defined by the appended claims.

What is claimed is:

1. A method of measuring timing asymmetry in a magnetic storage system comprising the steps of:
   providing manifestations along a track in a magnetic recording medium, each manifestation comprising a magnetic transition having either a negative-going or a positive-going direction, said manifestations being arranged such that a relatively large plurality of first and second substantially equal intervals are provided along said track, each first interval being formed by a beginning transition having a first direction and an ending transition having an opposite direction, and each second interval being formed by a beginning transition having said opposite direction and an ending transition having said first direction;
   moving said medium and a head where asymmetry is to be measured relative to one another so that said head traverses the manifestations in said track and produces head output signals in response thereto;
   detecting said head output signals produced by said head as said head and medium are relatively moved along said track; and
   producing in response to said detecting an indication of timing asymmetry based on the jitter detected between said first and second intervals.

2. The invention in accordance with claim 1, wherein a relatively large plurality of substantially equal third intervals are also provided along said track, each third interval being formed by beginning and ending transitions having a like direction, and wherein said indication is produced based on the resulting comparative jitter obtained when the jitter detected for said first and second intervals is compared with the jitter detected for said third intervals.

3. The invention in accordance with claim 2, wherein said indication of asymmetry is based on the standard derivation of said comparative jitter.

4. The invention in accordance with claim 1, 2 or 3, wherein said manifestations are provided as a relatively large plurality of first and second patterns provided in an interspersed manner along said track, said first patterns each including at least first, second and third magnetic transitions spaced so that the spacings between said first and second manifestations and between said first and third transitions are relatively large as compared to the spacing between said second and third transitions and said second patterns each having transitions located in substantially the same relative locations as those in each first-mentioned pattern but being oppositely directed thereto.

5. The invention in accordance with claim 4, wherein the first manifestation is sufficiently spaced from the second and third manifestations in each pattern so as to have substantially no effect on the detected locations thereof.

6. The invention in accordance with claim 5, wherein the spacing between the second and third manifestations in each pattern corresponds to the closest spacing required to be detected by said head.

7. The invention in accordance with claim 4, wherein said first intervals comprise the intervals between the first and second transitions of said first patterns and said second intervals comprise the intervals between the first and second transitions of said second patterns.

8. The invention in accordance with claim 7, wherein said third intervals comprise the intervals between the first and third of at least one of said first and second patterns.

* * * * *